(12) United States Patent
Tamura et al.

(10) Patent No.: US 6,904,225 B2
(45) Date of Patent: Jun. 7, 2005

(54) OPTICAL WAVEGUIDE PLATE OF SURFACE LIGHT EMITTING APPARATUS

(75) Inventors: Yuuki Tamura, Anan (JP); Koichi Kunikata, Anan (JP); Nobutoshi Shiota, Anan (JP); Eiji Nakanishi, Anan (JP)

(73) Assignee: Nichia Corporation, Tokushima (JP)

( * ) Notice: Subject to any disclaimer, the term of this patent is extended or adjusted under 35 U.S.C. 154(b) by 230 days.

(21) Appl. No.: 10/151,297

(22) Filed: May 21, 2002

(65) Prior Publication Data

US 2002/0197051 A1 Dec. 26, 2002

(30) Foreign Application Priority Data

May 22, 2001 (JP) ..................... P 2001-152515

(51) Int. Cl.⁷ .................................... G02B 6/00
(52) U.S. Cl. ................ 385/146; 385/147; 385/901; 385/31
(58) Field of Search ................ 385/146; 349/113

(56) References Cited

U.S. PATENT DOCUMENTS

| | | | | |
|---|---|---|---|---|
| 5,377,084 A | * | 12/1994 | Kojima et al. | ............... 362/31 |
| 5,863,113 A | * | 1/1999 | Oe et al. | ................... 362/31 |
| 5,921,651 A | | 7/1999 | Ishikawa | |
| 5,961,198 A | * | 10/1999 | Hira et al. | ................... 362/31 |
| 6,386,721 B1 | * | 5/2002 | Hosseini et al. | ............. 362/31 |
| 6,412,968 B1 | | 7/2002 | Ohkawa | |

FOREIGN PATENT DOCUMENTS

| | | |
|---|---|---|
| JP | 8-271893 A | 10/1996 |
| JP | 11119219 | 4/1999 |

* cited by examiner

Primary Examiner—John R. Lee
Assistant Examiner—Phillip A Johnston
(74) Attorney, Agent, or Firm—Nixon & Vanderhye PC

(57) ABSTRACT

An optical waveguide for emitting light of uniform intensity distributed over the light emitting surface so as to suppress the occurrences of bright lines includes an optical waveguide and surface light emitting apparatus that has a light emitting plane and a reflecting plane that oppose each other. The reflecting surface has a plurality of dots formed thereon so that light entering from the light source, provided on one end face or two opposing end faces, is output through the light emitting surface with uniform intensity, wherein the dots are arranged so as to form band regions each being defined as a region that has a constant density of distribution. A plurality of vertical lines of the dots are formed at substantially equal intervals in each of the band regions in the direction toward adjacent bands, and the interval between the vertical lines of dots is made different in different bands.

10 Claims, 14 Drawing Sheets

| | Row number | | | | |
|---|---|---|---|---|---|
| Column number | 1 | 2 | 3 | 4 | 5 |
| 1 | 90 | 60 | 10 | 60 | 90 |
| 2 | 60 | 30 | 30 | 30 | 60 |
| 3 | 50 | 50 | 50 | 50 | 50 |
| 4 | 75 | 75 | 75 | 75 | 75 |
| 5 | 100 | 100 | 100 | 100 | 100 |

OPTICAL WAVEGUIDE PLATE OF SURFACE LIGHT EMITTING APPARATUS

BACKGROUND OF THE INVENTION

1. Field of the Invention

The present invention relates to an optical waveguide plate of a surface light emitting apparatus used for spreading light from a light source over the entire light emitting surface and emitting the light.

2. Description of the Related Art

Such surface light emitting apparatus have recently been used as the light source for backlight of a liquid crystal display, that outputs light from a point source such as LED chip by spreading the light over a plane. In the surface light emitting apparatus, light emitted by one or more light emitting diode enters through one end of an optical waveguide plate that has opposing principal planes, and exits through the whole area of the other principal plane of the waveguide.

The surface light emitting apparatus has such a constitution as shown in a plan view of FIG. 20, comprising a casing 903, an optical waveguide plate 901 made of a transparent resin that has a first principal plane and a second principal plane, a light emitting diode 902 mounted so as to oppose the end face of the optical waveguide plate 901, and a reflector (not shown) mounted on the second principal plane of the optical waveguide plate, so that light emitted by the light emitting diode 902 is output through the entire area of one principal plane of the optical waveguide plate 901.

In the surface light emitting apparatus having the constitution described above, since light emitted by the light emitting diode 902 is attenuated while being transmitted through the optical waveguide plate 901, with the light intensity decreasing in inverse proportion to the distance from the light source, a light diffusion dot pattern is formed on the second principal plane that serves as the reflector so as to obtain light output uniformly distributed over the plane. The light diffusion dot pattern makes the luminance distribution uniform over the light emitting surface by increasing the density of dots or the area of each dot with the distance from the light source, thereby increasing the area occupied by the light diffusing dots.

FIG. 21 is a plan view showing a light diffusion dot pattern of a reflecting surface of the optical waveguide plate disclosed in Japanese Unexamined Patent Publication (KOKAI) No. 8-271893. In this example, the area of each of dots 102 is increased with the distance from a light source 101, thereby gradually increasing the proportion of area occupied by the light diffusing dots as the distance from the light source increases.

With the light diffusion dot pattern of the prior art shown in FIG. 21, however, there has been the problem of a bright line generated due to the arrangement of the light diffusing dots.

SUMMARY OF THE INVENTION

Thus, an object of the present invention is to provide an optical waveguide that can emit light of intensity uniformly distributed over the light emitting surface and that can suppress the occurrence of the bright line.

In order to achieve the object described above, the optical waveguide of a first surface light emitting apparatus of the present invention has a light emitting plane and a reflecting plane that oppose each other, with the reflecting surface having a plurality of dots formed thereon so that light entering from a light source that is provided on one end face or two opposing end faces is output through the light emitting surface with uniform intensity, wherein the dots are arranged so as to form band regions each being defined as a region that has a constant density of distribution, a plurality of vertical lines of the dots are formed at substantially equal intervals in each of the band regions in the direction toward adjacent bands, and the interval between the vertical lines of dots is made different in different bands.

In the optical waveguide of the first surface light emitting apparatus of the present invention having the constitution described above, since the interval between the vertical lines is made different between adjacent bands, there is no vertical line extending over a long distance and the occurrence of bright line can be prevented.

The optical waveguide of a second surface light emitting apparatus of the present invention has a light emitting plane and a reflecting plane that oppose each other, with the reflecting surface having a plurality of dots formed thereon so that light entering from a light source provided on one end face or two opposing end faces is output through the light emitting surface with uniform intensity, wherein the dots are arranged so as to form band regions each being defined as a region that has a constant density of distribution, a plurality of vertical lines of the dots are formed at equal intervals in each of the band regions in the direction toward adjacent bands, and the dots are arranged in two adjacent band regions so that the vertical lines of dots in one band region and the vertical lines of dots in the other band region do not lie in the same straight lines.

In the optical waveguide of the second surface light emitting apparatus of the present invention having the constitution described above, since the dots are arranged in two adjacent band regions so that the vertical lines of dots in one band region and the vertical lines of dots in the other band region do not lie in the same straight lines, there is no vertical line extending over a long distance and the occurrence of the bright line can be prevented.

In the optical waveguides of the first and second surface light emitting apparatus of the present invention, such a constitution may also be employed as the dots are arranged so that a plurality of horizontal lines are formed at right angles to the vertical lines in each of the band regions, while the interval between the vertical lines and the interval between the horizontal lines are determined in accordance to the density of dots in the band region.

An optical waveguide of the third surface light emitting apparatus of the present invention has a light emitting plane and a reflecting plane that oppose each other, with the reflecting surface having a plurality of dots formed thereon so that light entering from a light source that is provided on one end face or two opposing end faces is output through the light emitting surface with uniform intensity, wherein the dots are arranged so as to form the band region that is defined as a region where the dots are distributed with uniform distribution, with the concentration of dots being different between adjacent band regions, and the dots are disposed at lattice points of a lattice consisting of square cells in each of the band regions.

In the optical waveguides of the third surface light emitting apparatus of the present invention having the constitution described above, since every band region has the dots distributed in different density therein than in the adjacent band regions and the dots are disposed at lattice points of the lattice consisting of square cells in each of the band regions, the distance between adjacent dots arranged in the lattice pattern is different between adjacent band regions.

Thus the interval between the vertical lines of dots is made different in the adjacent band regions in the optical waveguides of the third surface light emitting apparatus, and therefore there is no vertical line extending over a long distance, and the occurrence of bright line can be prevented, similarly to the first surface light emitting apparatus.

In the optical waveguides of the first through third surface light emitting apparatus of the present invention, density of dots in each band region is preferably changed according to the attenuation of light transmitted from the light source so that a region that receives light with greater attenuation has the dots in higher density, which enables it to emit light with uniform intensity.

In the optical waveguides of the first through third surface light emitting apparatus of the present invention, such a constitution may also be employed as the dots are arranged randomly in a density that is set according to the attenuation of light, in part of the reflector surface located on both sides of the end face where the light source is mounted.

Moreover, in the optical waveguides of the first through third surface light emitting apparatus of the present invention, it is preferable that the dot has a concave portion and a convex portion, which enable the dot to diffuse light more effectively.

Each dot may be constituted either from a convex portion and a concave portion that surrounds the former, or from a concave portion and a convex portion that surrounds the former As described above, in the optical waveguide of the surface light emitting apparatus according to the present invention, since the dots are arranged so as to form band regions each being defined as a region that has a constant density of distribution and no vertical line extends over a long distance across adjacent band regions, the occurrence of bright line can be prevented.

Also according to the present invention, the dots may be randomly distributed in such a proper density required to prevent the occurrence of bright lines, thereby to effectively prevent the occurrence of bright lines.

Therefore, the present invention can provide the optical waveguide that is capable of emitting light uniformly through the light emitting surface, and suppressing the occurrence of bright lines.

DESCRIPTION OF THE PREFERRED EMBODIMENTS

Now the optical waveguide plate of the surface light emitting apparatus according to preferred embodiments of the present invention will be described below with reference to the accompanying drawings.

First Embodiment

The first embodiment of the present invention provides an optical waveguide plate of a surface light emitting apparatus having such a constitution that light emitted by a light source is output with uniform intensity through a light emitting surface by forming a multitude of dots in a predetermined pattern on a reflecting surface that is a principal plane opposing another principal plane serving as the light emitting surface, wherein the dots are distributed in a pattern unique to the present application.

Specifically, the optical waveguide of the first embodiment has the dots formed as described below in major portions of the reflecting surface except for corners 52a, 52b located at both sides of the end face where a light source 10 is provided.

Figure 1:
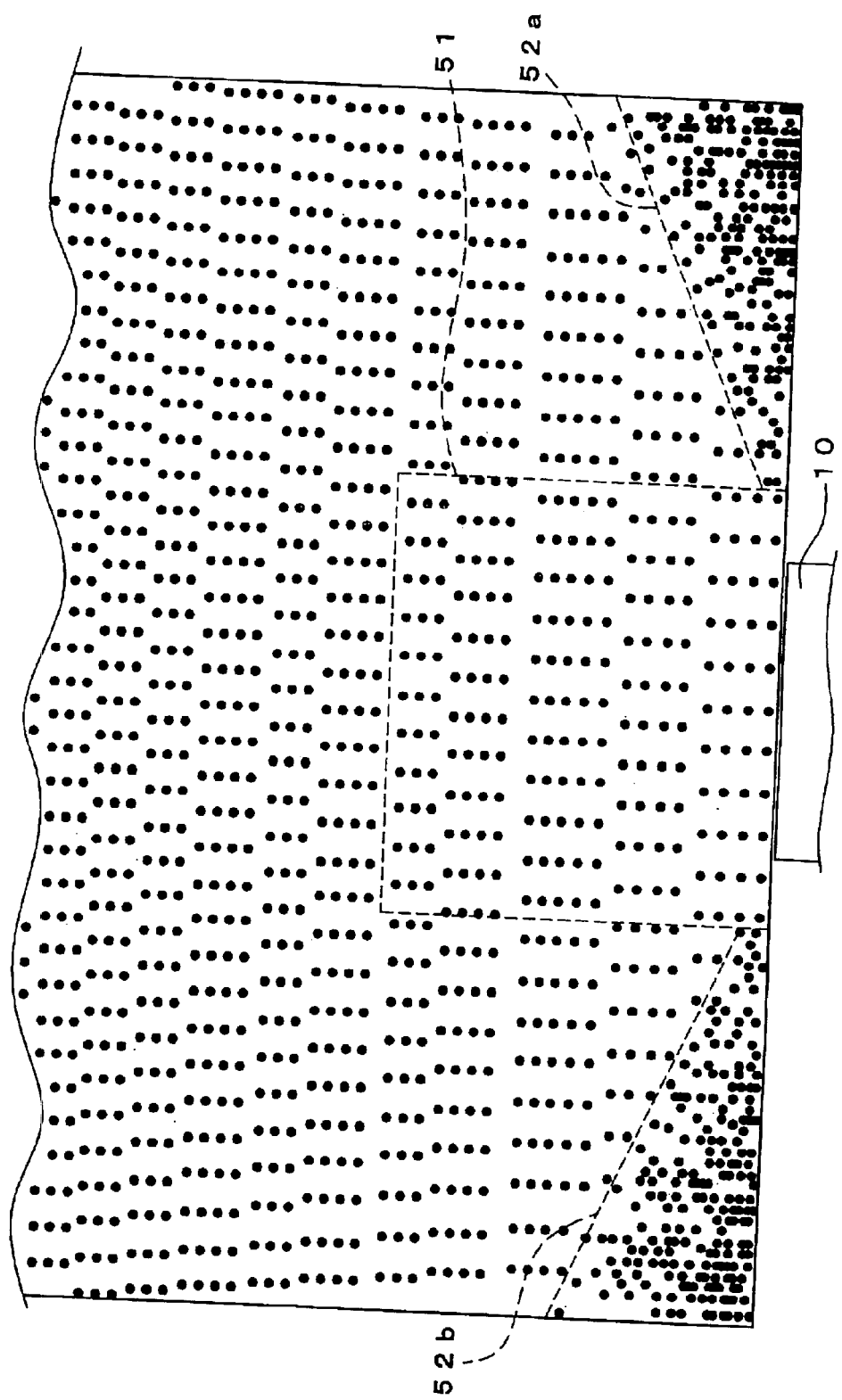
FIG. 1 is a plan view showing the distribution of dots formed on a reflecting surface of an optical waveguide plate according to first embodiment of the present invention.
Figure 2:
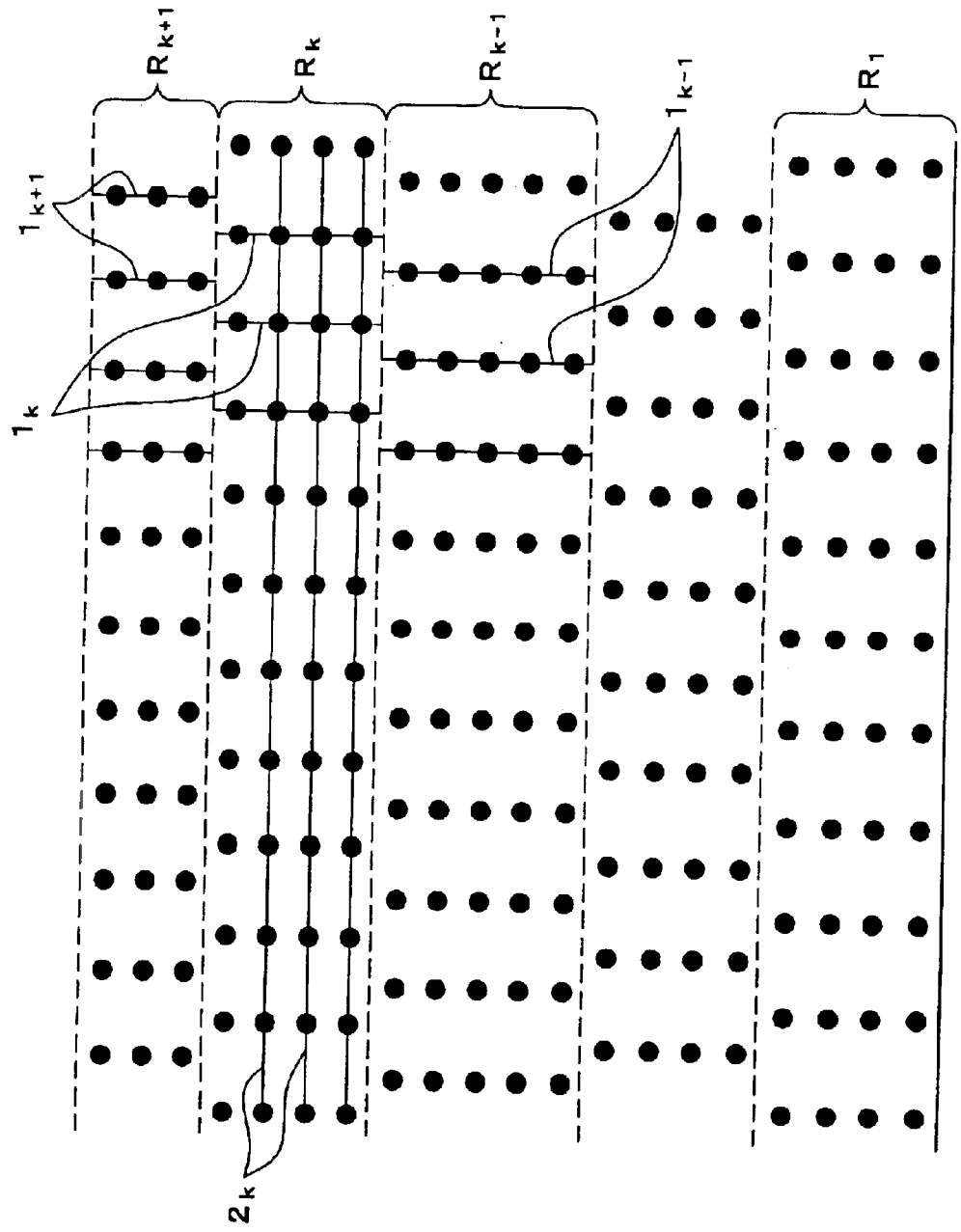
FIG. 2 is an enlarged plan view of a part 51 of FIG. 1.

FIG. 1 is a plan view showing the distribution of the dots formed on the reflecting surface of the optical waveguide plate, and FIG. 2 is an enlarged view of a part (indicated by numeral 51) of FIG. 1.

(Band Region where Dots are Distributed in Constant Density)

In the reflecting surface of the first embodiment, the dots are arranged so that the area where the dots are uniformly distributed forms a band region as shown in FIG. 2.

Figure 3:
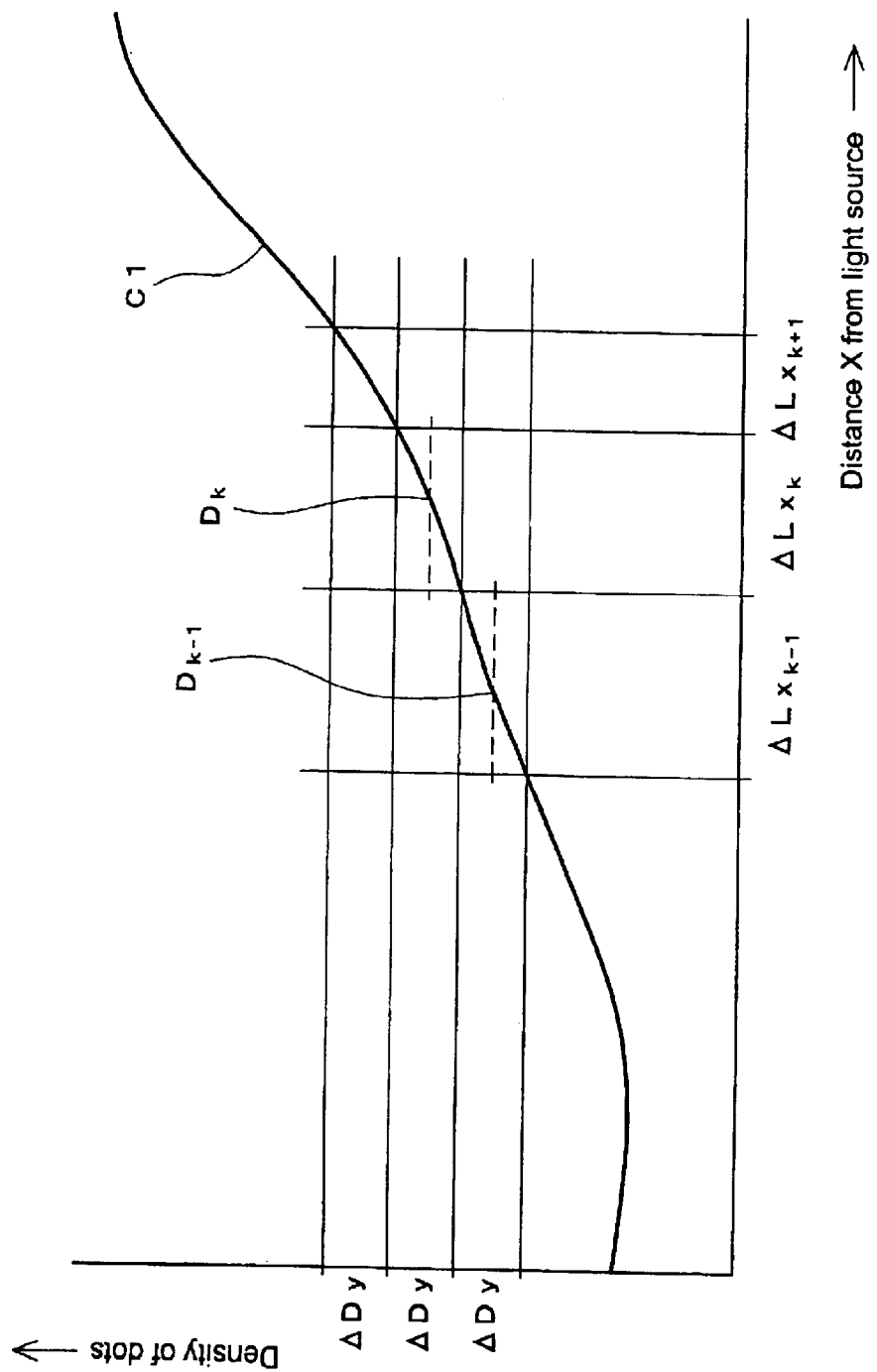
FIG. 3 is a graph showing the density distribution of dots formed on the reflecting surface of the optical waveguide plate according to the first embodiment.

The band region $R_k$ (k=1, 2, 3, . . . , n) are defined by setting a border line every time the density of dots is increased by $\Delta Dy$ in the dot density curve C1 shown in FIG. 3.

The density of dots distributed in a band region $R_k$ may be set to a dot density $D_k$ that is the mean value of the maximum density and the minimum density on the dot density curve C1 of the particular region, while the dots are formed with uniform density within each band region $R_k$ (the dot density $D_k$ is the same anywhere in the band region $R_k$).

In other words, a band region $R_k$ is defined as a region that has a constant concentration of distribution.

In the first embodiment, width $\Delta Lx_k$ of a band region $R_k$ is set to a sufficiently small value compared to the length of the optical waveguide plate, so that the density of dots in the first embodiment can be effectively considered to be equivalent to that determined according to the dot density curve C1 shown in FIG. 3, even with the density of dots is set uniformly within each band region $R_k$.

(Arrangement of Dots in each Band Region $R_k$)

In the band region $R_k$ of the first embodiment, the dots are arranged so as to form vertical lines $1_k$ in the direction toward the adjacent band region (the longitudinal direction of the optical waveguide plate in the case of the first embodiment) as shown in FIG. 2.

Also in each band region $R_k$, dots are arranged so as to form a plurality of horizontal lines $2_k$ that are perpendicular to the vertical lines $1_k$.

The distance between the vertical lines $1_k$ and the distance between the horizontal lines $2_k$ are determined so as to meet the requirement of the dot density $D_k$ for the band region $R_k$.

(Dot Arrangement Required in Adjacent Band Regions $R_k$, $R_{k+1}$)

In the first embodiment, the distance between the vertical line $1_k$ of dots formed in each band region $R_k$ is made different from the distance between the vertical line $1_{k+1}$ of dots formed in the adjacent band region $R_{k+1}$.

Also the dots are arranged so that the vertical line $1_k$ of the dots formed in a band region $R_k$ and the vertical line $1_{k+1}$ of the dots formed in a band region $R_{k+1}$ adjacent therewith do not lie in a single straight line.

Also according to the present invention, it is preferable to increase the distance between the vertical line $1_k$ of a band region $R_k$ and the vertical line $1_{k+1}$ of the adjacent band region $R_{k+1}$ where a bright line is likely to occur, so as to enable it to effectively suppress the occurrence of the bright line. Accordingly, the vertical line $1_{k+1}$ of the band region $R_{k+1}$ is preferably located on the center line of the adjacent vertical line $1_k$ of the band region $R_k$ in the vicinity of the extended line of the optical axis of the light source on the reflecting surface of the optical waveguide plate.

Thus according to the first embodiment, since the distance between the vertical line $1_k$ in the band region $R_k$ is made different from the distance between the vertical line $1_{k+1}$ in the adjacent band region $R_{k+1}$ and the vertical line $1_k$ in the band region $R_k$ and the vertical line $1_{k+1}$ in the band region $R_{k+1}$ are arranged so as not to lie in a single straight line, the occurrence of a bright line can be prevented.

That is, while the dots are arranged along straight lines in every band region $R_k$ in the first embodiment, every band region $R_k$ is limited within a definite area and therefore the dots never lie on a long straight line that extends beyond the band region $R_k$, so that the dots lying on straight lines in the band region $R_k$ do not generate perceptible bright lines.

Thus in the first embodiment, the dots can be prevented from being undesirably distributed by arranging the dots according to a certain rule in each band region $R_k$, and the occurrence of a bright line is prevented by changing the rule of arranging the dots between adjacent band regions.

While the distance between the vertical line $1_k$ in the band region $R_k$ is made different from the distance between the vertical line $1_{k+1}$ in the adjacent band region $R_{k+1}$ and the vertical line $1_k$ in the band region $R_k$ and the vertical line $1_{k+1}$ in the band region $R_{k+1}$ are arranged so as not to lie in a single straight line in the first embodiment, the present invention is not limited to this constitution and positions of the vertical line in each band region may be determined so as to meet either one of the conditions.

That is, when the distance between the vertical line $1_k$ in the band region $R_k$ is made different from the distance between the vertical line $1_{k+1}$ in the adjacent band region $R_{k+1}$ and the vertical line $1_{k+1}$ in the band region $R_{k+1}$ the dots hardly lie on a straight line that extends over three band regions $R_k$, $R_{k+1}$, $R_{k+2}$, although some dots may lie on a straight line that extends across two adjacent band regions $R_k$, $R_{k+1}$. Therefore, according to the present invention, operations and effects similar to those of the first embodiment can be achieved simply by making the distance between the vertical line $1_k$ in the band region $R_k$ different from the distance between the vertical line $1_{k+1}$ in the adjacent band region $R_{k+1}$.

Also in one band region $R_k$, when the dots are arranged so that the distance between the vertical line $1_k$ near the central portion is made different from the distance between the vertical line $1_{k+1}$ in portions away from the central portion, operations and effects similar to those of the first embodiment can be achieved simply by employing such an arrangement as the vertical line $1_k$ of the band region $R_k$ and the vertical line $1_{k+1}$ of the band region $R_{k+1}$ do not lie on the same line.

(Arrangements of Dots in Corners 52a, 52b of the Reflecting Surface)

On the reflecting surface of the optical waveguide plate according to the first embodiment, the dots are arranged randomly in a predetermined density in the corners 52a, 52b located on both sides of the end face where the light source 10 is mounted.

The corners 52a, 52b receives less light due to the directivity of the light and tend to be darker, and therefore require higher density of dots than other portions. Since it is not necessary to arrange the dots in accordance to the predetermined rule in these portions, the dots are arranged randomly in the corners 52a, 52b in the first embodiment.

Random arrangement in the predetermined density may be also be achieved in the corners 52a, 52b by arranging the dots according to a rule similar to that for the band region and then adding the dots randomly.

Now an example of the method of setting the dot pattern according to the first embodiment will be described below.

(Step 1)

According to this method, first, the dot size is determined by giving consideration to the shape of the optical waveguide plate and the manufacturing method to be employed in forming the dots.

(Step 2)

Then the dot area ratio (proportion of the area occupied by the dots to the unit area) at each position on the reflecting surface is set, so that the light intensity distribution is uniform over the light emitting surface. The dot area ratio is set in accordance to the attenuation of the light, so as to be higher in a portion where light is subjected to higher attenuation.

Based on the dot area ratio and the dot size determined in step 1, a dot density curve (C1 shown in FIG. 3) is drawn.

(Step 3)

Then the band regions $R_k$ (k =1, 2, 3, . . . , n) are defined by setting the border lines every time the density of dots is increased by $\Delta Dy$ according to the dot density curve (C1 shown in FIG. 3) that has been drawn in step 2, thereby to set the density of dots in each band region $R_k$ to, for example, the mean value of the maximum density and minimum density on the dot density curve C1 of the particular region.

(Step 4)

Figure 4:
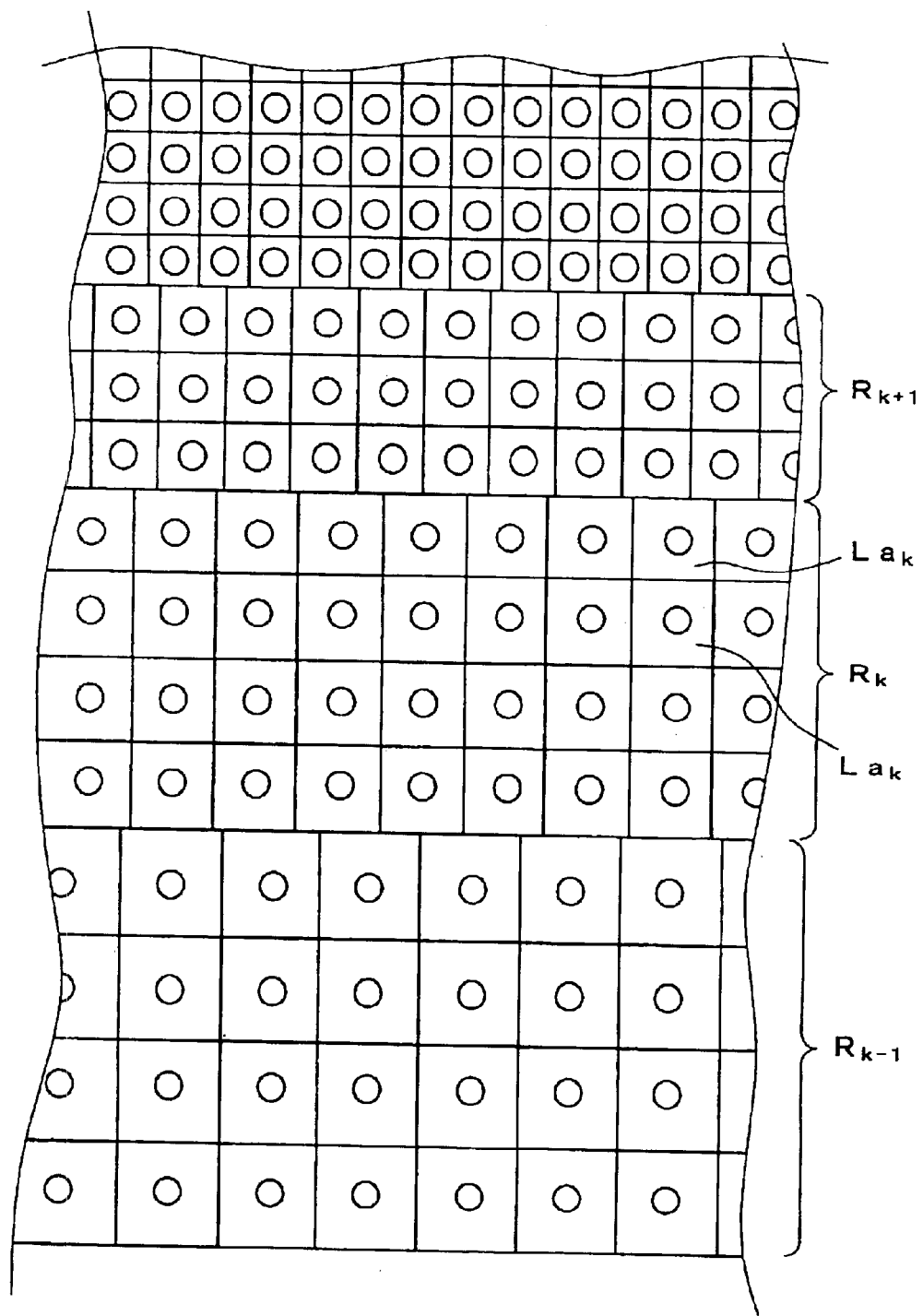
FIG. 4 is a plan view showing the dots formed in a lattice pattern in each band region by a method of setting the dot pattern according to the first embodiment
Figure 5:
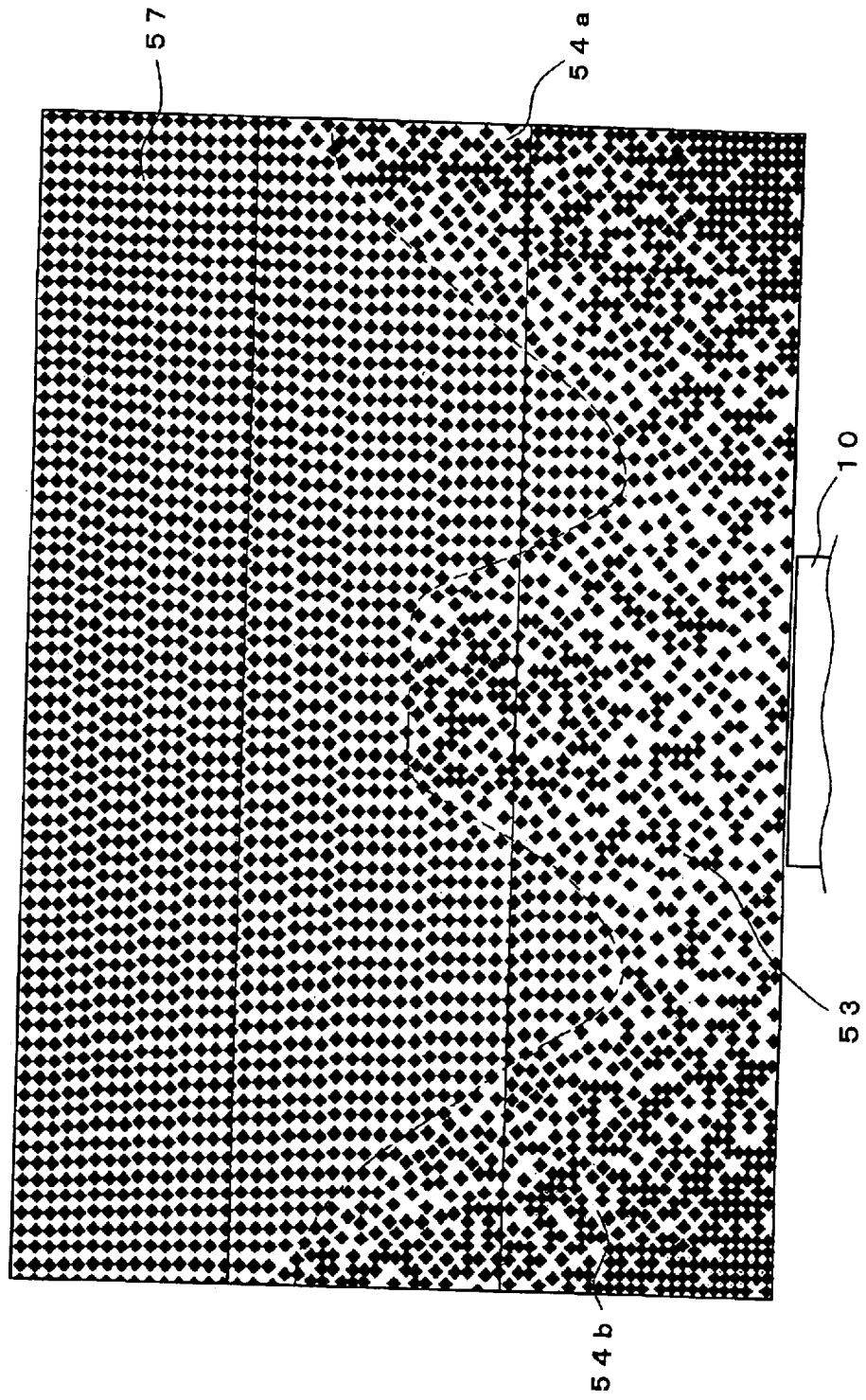
FIG. 5 is a plan view showing the distribution of dots formed on a reflecting surface of an optical waveguide plate according to second embodiment of the present invention.

Then each band region $R_k$ is divided into cells as shown in FIG. 4 according to the dot density $D_k$ that has been set for each region, and one dot is placed at the center of each lattice $La_k$. That is, one dot is formed in each lattice $La_k$ and the size of the lattice $La_k$ is determined so as to achieve the dot density $D_k$ in the band region $R_k$.

More specifically, area SLa of each cell is determined by equation (1) and length P of one side of the cell is determined as the square root of the area (equation (2)).

$$\text{Area } SLa = (\text{Unit area})/(\text{Dot density } D_k) \quad (1)$$

$$\text{Length P of cell side} = \sqrt{(\text{Area SLa})} \quad (2)$$

Once the arrangement of dots is determined as described above, length of the cell on one side thereof is different between the adjacent band regions $R_k$, $R_{k+1}$ due to the different density of dots, and therefore the distance between the vertical line $1_k$ of the band region $R_k$ and the distance between the vertical line $1_{k+1}$ of the band region $R_{k+1}$ are set to different values.

Thus the dots can be arranged so that the vertical line $l_k$ of the band region $R_k$ and the vertical line $l_{k+1}$ of the band region $R_{k+1}$ do not lie on the same straight line, thereby preventing the occurrence of a bright line.

While some dots may lie on a straight line that extends across two adjacent band regions when the arrangement of dots is determined as described above, the probability is nearly zero for the dots to lie on one straight line that extends across three band region, and therefore the occurrence of perceptible bright lines can be prevented.

Needless to say, the dots arranged as described above form a new lattice consisting of lattice points located at the center of each cell of the lattice that separates the band region.

In the optical waveguide plate of the surface light emitting apparatus of the first embodiment described above, the dots are arranged by defining the band regions over the entire surface of the reflecting surface except for the corners 52a, 52b.

However, the present invention is not limited to the constitution described above, and the dots may also be arranged so as to prevent the occurrence of bright line more effectively in the portion of the reflecting surface near the light source where bright line tends to occur more conspicuously (for example, the portion denoted by 51 in FIG. 1).

Second Embodiment

An optical waveguide plate of the second embodiment will be described below.

The optical waveguide plate of the second embodiment has the dots arranged randomly on the side of end face where the light source 10 is mounted, so as to prevent the occurrence of bright line more effectively than the optical waveguide plate of the first embodiment.

Specifically in the optical waveguide plate of the second embodiment, the dots are arranged on the side of the end face where the light source 10 is mounted so that the required density of dots is satisfied in the region 53 in front of the light source 10 and in the corners 52a, 52b located on both sides of the region 53, and the dots are arranged similarly to the first embodiment in the region 53 and in the region 57 (region away from the end face where the light source 10 is mounted) except for the corners 52a, 52b.

Now the arrangement of dots in the region 53 and in the corners 54a, 54b according to the second embodiment of the present invention will be described in detail below.

In alight diffusion dot pattern on the reflecting surface of the optical waveguide plate of the second embodiment, dots are randomly distributed so as not to lie on the same straight line with the density of dots increasing with the distance from the light source 10 in the region 53 to compensate for the attenuation of the light emitted by the light source, thereby suppressing the occurrence of bright line in the light emitting surface of the optical waveguide plate (particularly in the vicinity of the light source 10).

In the second embodiment, density of dots in the region 53 is set according to the dot density curve shown in FIG. 3 that has been described in the first embodiment.

Figure 6:
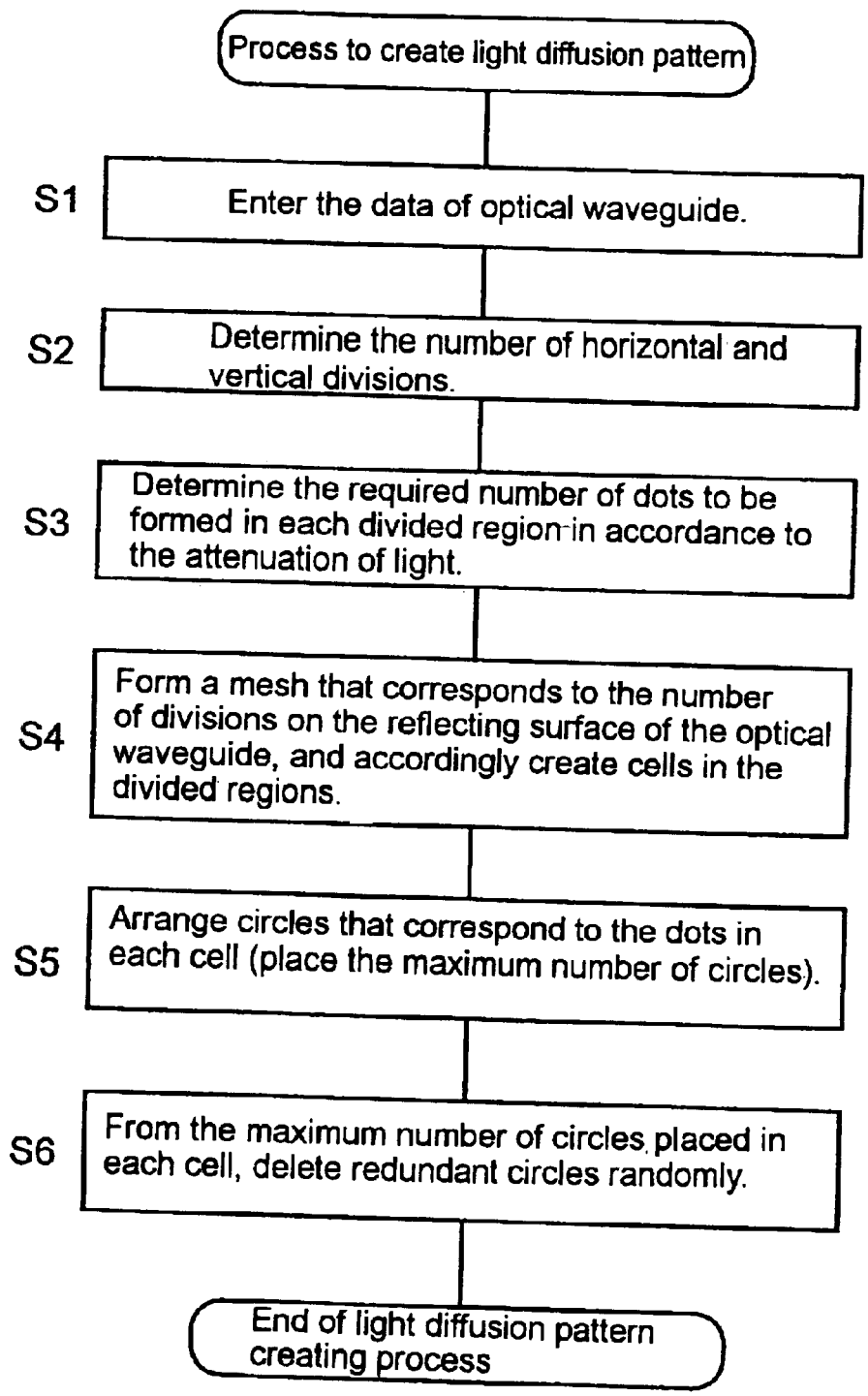
FIG. 6 is a flow chart of light diffusion pattern creating method in a region 53 according to the second embodiment of the present invention.

Now the light diffusion dot pattern for the region 53 in the second embodiment will be described below with reference to the flow chart shown in FIG. 6.

In step S1 of this method, data related to the optical waveguide plate required for creating the light diffusion dot pattern are input including the shape of the optical waveguide plate, entering position of light (mounting position of the light source) and shape and dimensions of the dots.

In step S2, numbers of vertical and horizontal divisions of the reflecting surface of the optical waveguide plate are determined in accordance to the data related to the optical waveguide plate (the shape of the optical waveguide plate and shape and dimensions of the dots) that have been input in step S1.

When determining the numbers of vertical and horizontal divisions, it is preferable to set the length of one side of the divided cell to a multiple of the dot diameter or approximately thereto. This makes it possible to form the dots without empty space in a cell and without an empty space between the dots of adjacent cells.

Also according to the present invention, in order to change the density of dots smoothly, the numbers of horizontal and vertical divisions are preferably determined so that the divided cells are substantially square and the maximum number of dots that can be formed in the divided cells satisfies the condition described below.

In case the dot is round, the division is carried out so that the product of the maximum number of dots that can be placed in each cell and the dot diameter is from 5 to 10 (mm•number)

In case the dot is square, the division is carried out so that the product of the maximum number of dots that can be placed in each cell and the width of the dot is from 5 to 10 (mm•number).

The procedure of step S2 is as follows, for example, when the optical waveguide plate measures 66 mm vertically and 18 mm horizontally and the dot is a circle 60 μm in diameter.

First, a preferable range of the maximum number of dots is determined as 83 to 167 (5 to 10 mm•number/0.06 mm) based on the condition described above.

Then, the preferable number of dots to be placed along one side of the substantially square region is determined to be from 9 to 13 from the preferable range of the maximum number of dots.

The length of one side of the region is determined in accordance to the product of the preferable number of dots to be placed along one side of the region (9 to 13) and the dot diameter 0.06 mm.

In the case of the optical waveguide plate having the dimension described above the plate, it is divided by 100 into parts each measuring 0.660 mm in the vertical direction and divided by 30 into parts each measuring 0.600 mm in the horizontal direction With this division, 110 dots can be placed side by side without space by placing 11 dots in the vertical direction and 10 dots in the horizontal direction. This division also makes it possible to arrange the dots without empty space between the dots in the adjacent regions.

In step S3, required number of dots to be formed in each region that has been divided in step S2 is determined in accordance to the attenuation of light on the optical waveguide plate.

Specifically, a density function is defined for the attenuation of light on the optical waveguide plate, and the required number of dots to be formed in each region is determined from the density function.

The density function represents the density distribution of dots as a function of the distance from the light source and the direction (namely the position on the reflecting surface) on the reflecting surface of the optical waveguide plate, and has a small value near the light source where light is less attenuated and has a large value away from the light source where light is more attenuated. The density function also increases with the angle from the optical axis of the light source, and decreases as the angle from the optical axis of the light source decreases.

Density function for a constitution having a plurality of light sources can be created by adding the density function for each light source.

Figures 7, 8:
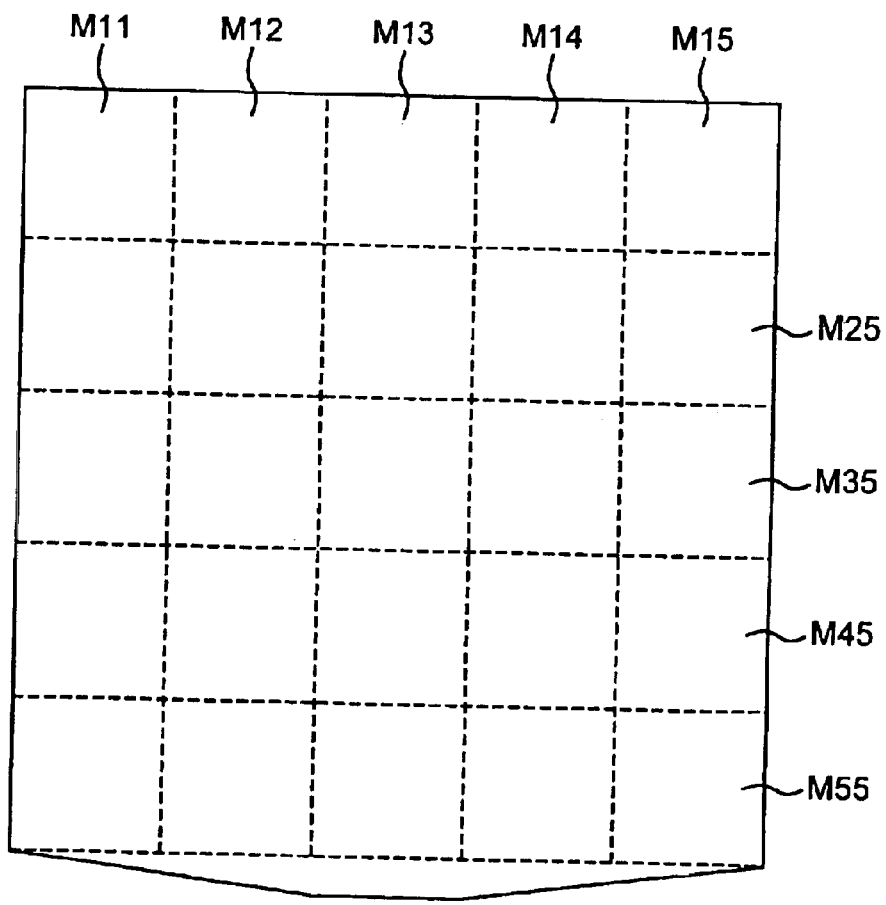
FIG. 7 shows an example of a table showing the numbers of dots required in different regions, determined in step S3 of the light diffusion pattern creating method according to the second embodiment of the present invention.
FIG. 8 is a plan view showing the reflecting surface of the optical waveguide plate divided in a mesh pattern determined in step S3 of the light diffusion pattern creating method according to the second embodiment of the present invention.
Figure 9A:
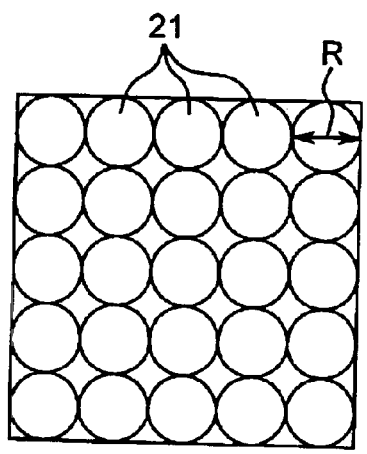
FIG. 9A shows circles drawn in correspondence to the dots of the maximum number that can be placed in each cell in step S5 of the light diffusion pattern creating method according to the second embodiment.
Figure 9B:
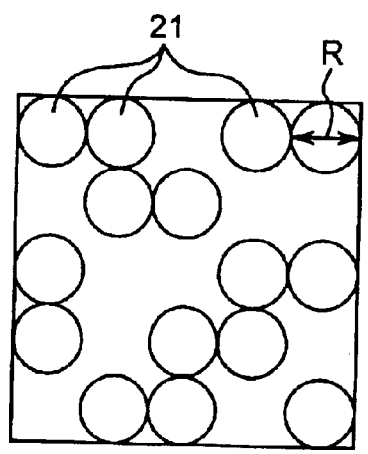
FIG. 9B shows the state of the required number of circles left in each cell by deleting redundant dots from the circles that have been placed in each cell in close-packed arrangement in step S5, thereby to leave the circles of the number required in each cell in step S6.

FIG. 7 shows an example (in the case of division by 5 in both vertical and horizontal directions) of table of the required number of dots to be formed in each region that has been determined in step S3. In the example shown in FIG. 7, the light source is placed in front of the region located at row 1 and column 3.

In step S4, the reflecting surface of the optical waveguide plate is divided into cells according to the number of divisions determined in step S2 on, for example, a computer display.

FIG. 8 shows an example of mesh having 25 cells (5×5) from M11 through M55 according to the division shown in FIG. 7.

In step S5, circles having diameter of R that represent the dots (referred to dot 21) are drawn by the maximum number of dots that can be placed in each cell (close-packed arrangement).

Then in step S6, redundant dots are randomly deleted from the dots 21 that have been placed in each cell in close-packed arrangement in step S5, thereby to leave the dots 21 of the number required in each cell (the number determined for each cell in step S3).

Thus the circles are drawn representing the number of required dots randomly arranged in each cell.

Such a light diffusion dot pattern is thus created as the density of dots increases with the distance from the light source so as to compensate for the attenuation of light and the dots are randomly arranged so as not to lie on straight lines.

In step S5 and step S6 of the second embodiment described above, redundant circles may be randomly deleted from the circles that have been placed in close-packed arrangement for each cell in step S6 after drawing the maximum number of circles in all cells or, alternatively, after drawing the maximum number of circles in one cell in step S5, redundant circles may be randomly deleted from the circles that have been placed in the cell in step S6 and then repeating the operations of steps S5 and S6 for every cell.

Variation of Second Embodiment

In the light diffusion pattern creating method of the second embodiment described above, circles representing the dots are placed in each cell in step S5 and redundant circles are randomly deleted from the circles of each cell in step S6, but the present invention is not limited to this procedure. Step S5 and step S6 may be replaced with the procedure described below.

Figure 10A:
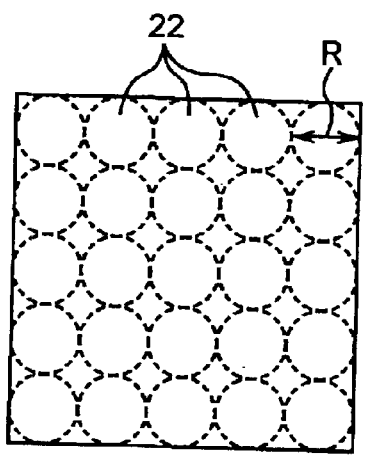
FIG. 10A shows the positions to place the dots being determined so that the maximum number of dots can be placed in each cell without any dots overlapping each other, in the light diffusion pattern creating method according to a variation of the present invention.

Positions 22 for placing dots are determined in each cell so as to pace the maximum number of dots in each cell without any dots overlapping each other as shown in FIG. 10A.

Figure 10B:
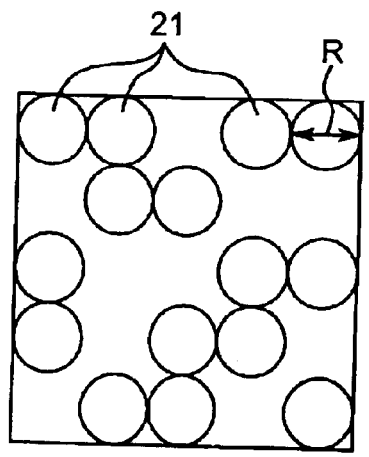
FIG. 10B shows a state after the required number of dots that has been determined in step S3 are randomly placed in each cell where the positions to place the dots have been determined.

The dots 21 having diameter of R are placed randomly by the required number determined in step S3 in each cell where the positions to place the dots have been determined, as shown in FIG. 10B.

This procedure also creates such a light diffusion dot pattern as the density of dots increases with the distance from the light source so as to compensate for the attenuation of light and the dots are randomly arranged so as not to lie on straight lines.

According to the methods for creating the light diffusion dot pattern of the second embodiment and the variation of the second embodiment, the light diffusion dot pattern capable of suppressing the occurrence of bright line in the light emitting surface can be created easily in a short period of time.

Although the circular dots are used in the second embodiment, the present invention is not limited to this constitution and the dots may have rectangular or other shape.

Effects similar to those of the second embodiment can also be achieved in this way.

In this case, the light diffusion dot pattern consisting of rectangular dots may be formed so that the centers of the rectangular dots coincide with the centers of the circular dots of the light diffusion dot pattern created in steps S1 through S6.

In the method of creating the light diffusion dot pattern according to the second embodiment, circular dots are placed side by side without space therebetween, but the present invention is not limited to this constitution. For example, the present invention may also be applied to a case where dots having diameter of r (r<R) are placed with a predetermined distance from each other.

In this case, too, the light diffusion dot pattern consisting of dots placed with a predetermined distance from each other may be formed so that the centers of the circular dots having diameter of r smaller than R coincide with the centers of the circular dots having diameter R placed side by side without space therebetween in the light diffusion dot pattern created in steps S1 through S6.

In this case, the distance between adjacent dots that are place most closely to each other is (R-r) within a cell as well as between adjacent cells.

(Setting the Region 53 where Dots are Placed Randomly)

The region 53 where dots are placed randomly in the second embodiment is set as follows.

In the second embodiment, random arrangement of the dots is applied to the portion where the bright line is most likely to occur, as described above.

Thus the position where the dots are to be randomly placed can be defined by a circle having center at the light emitting point of the light source 10, considering the fact that the portion where bright line is most likely to occur is within a particular distance from the light source 10.

Figure 11:
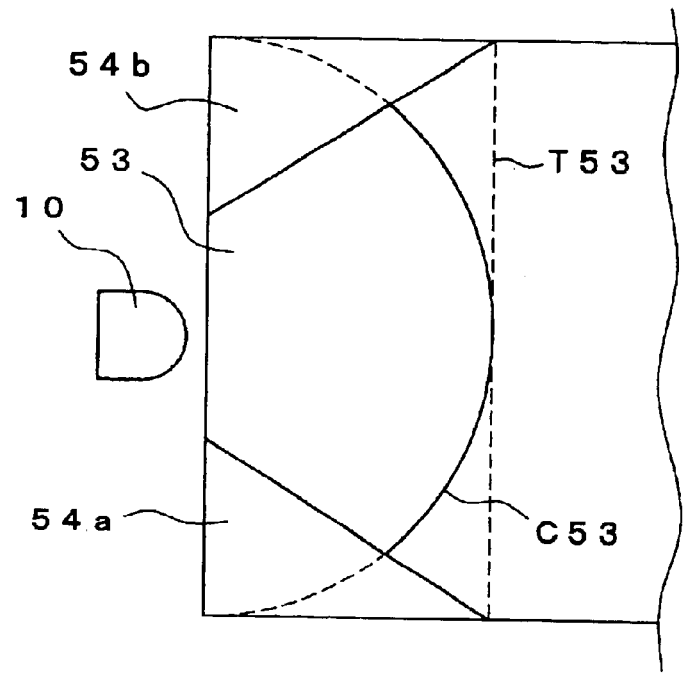
FIG. 11 is a plan view showing the range of a region 53 in the second embodiment.

Specifically, a semicircle C53 having a diameter equal to the width of the optical waveguide plate is drawn with the center located at the center of the end face where the light source 10 is mounted, as shown in FIG. 11, and the portion inside of the semicircle C53 except for the corners 54a, 54b is defined as the region 53 where the dots are to be randomly placed. Brightness distribution over the light emitting surface of the optical waveguide plate can be made extremely uniform when the arrangement described in the first embodiment is applied to the other portions except for the region 53 and the corners 54a, 54b.

The reason for omitting the corners 54a, 54b from the semicircle C53 is the fact that bright line is less likely to occur in the corners 54a, 54b due to the directivity of the light source 10. In the corners 54a, 54b, luminance of the light is lower (light is attenuated more) than in the other portion due to the directivity of the light source 10, and therefore the number of dots is preferably increased according to the degree of attenuation of light.

In the corners 54a, 54b, dots may be arranged either randomly or regularly, as long as the desired density is satisfied.

In case the region 53 where the dots are to be randomly placed is defined as shown in FIG. 11, the portion where bright line is likely to occur varies depending on the directivity of the light source or other factor, and the diameter of the semicircle C53 may be made smaller than the width of the optical waveguide plate in accordance to the characteristic of the light source.

Figure 12:
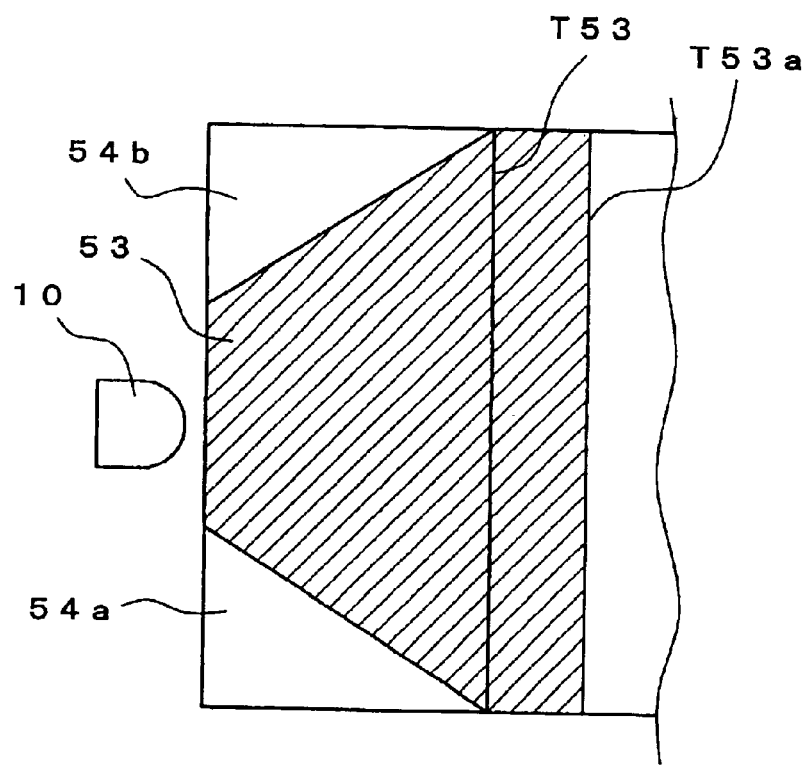
FIG. 12 is a plan view showing the region 53 that is set in a range different from that shown in FIG. 11 according to the second embodiment.

According to the second embodiment, definition of the region 53 shown in FIG. 12 may be employed instead of the fan-shaped region 53 shown in FIG. 11.

That is, the region 53 maybe defined as the region located nearer to the light source than a border line T53 that is parallel to the end face where the light source is mounted and is a tangential line of the semicircle C53 shown in FIG. 11 minus the corners 54a, 54b in FIG. 12.

In this case, the region 53 may also be defined by the border line T53a that is a translation of the border line T53 moved 0 to 5 mm away from the light source.

Figure 13:
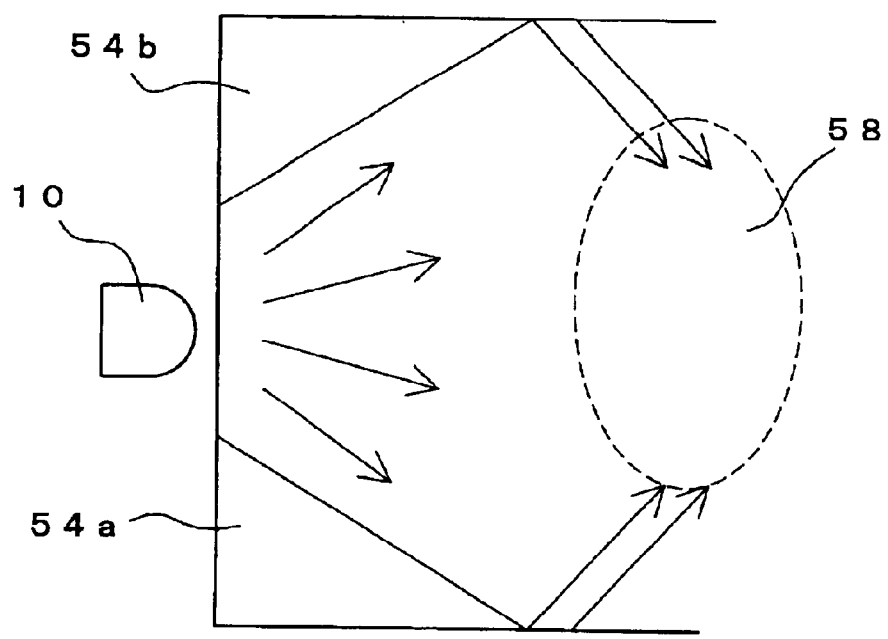
FIG. 13 is a plan view showing the direction of light propagation in the second embodiment.

In the portion (indicated with numeral 58 in FIG. 13) that is more distant from the light source than the region 53 that is defined as described above, light that has reflected on the side face and light transmitted directly from the light source are mixed, thereby suppressing the occurrence of bright line.

According to the present invention, as described above, the occurrence of bright line can be prevented by placing the dots in random arrangement in such a portion where the bright line is most likely to occur due to the influence of directivity of the light source.

Variation (Shape of Dots)

According to the present invention, the dots may comprise either concave or convex, and may have various shape to be described later.

Preferable dot shapes that can be employed in the present invention will now be described below with reference to FIG. 14 through FIG. 19. In each of FIG. 14 through FIG. 19, a sectional view and a plan view are shown.

The present invention is not limited to the dot shapes shown in FIG. 14 through FIG. 19 and various other shapes can also be employed.

Figure 14:
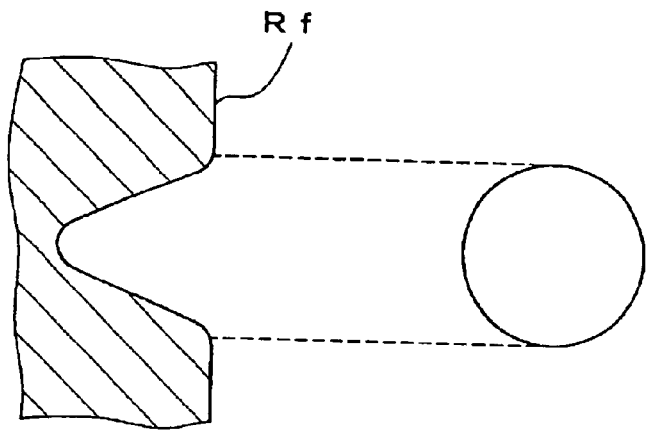
FIG. 14 shows the shape of dot (variation 1) that can be employed in the optical waveguide plate according to the present invention, in a sectional view and a plan view.

FIG. 14 shows a dot consisting of a relatively simple recess from a datum reflection surface Rf, that can be easily made.

Figure 15:
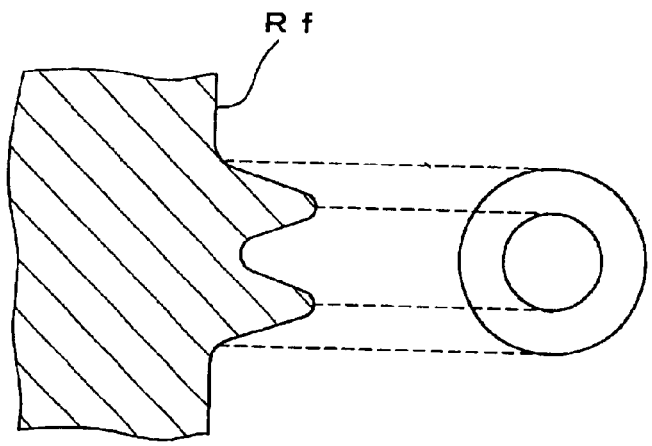
FIG. 15 shows the shape of dot (variation 2) that can be employed in the optical waveguide plate according to the present invention, in a sectional view and a plan view.
Figure 16:
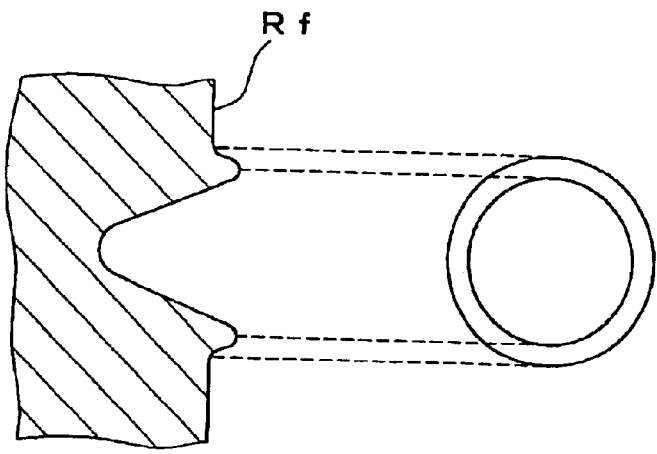
FIG. 16 shows the shape of dot (variation 3) that can be employed in the optical waveguide plate according to the present invention, in a sectional view and a plan view.

FIG. 15 shows a dot consisting of a ring-shaped ridge rising above the datum reflection surface Rf, and FIG. 16 shows a dot consisting of the recess shown in FIG. 14 that us surrounded by a ridge. The dots shown in FIG. 15 and FIG. 16 have higher effect of diffusing light than the simple recess shown in FIG. 14.

Figure 17:
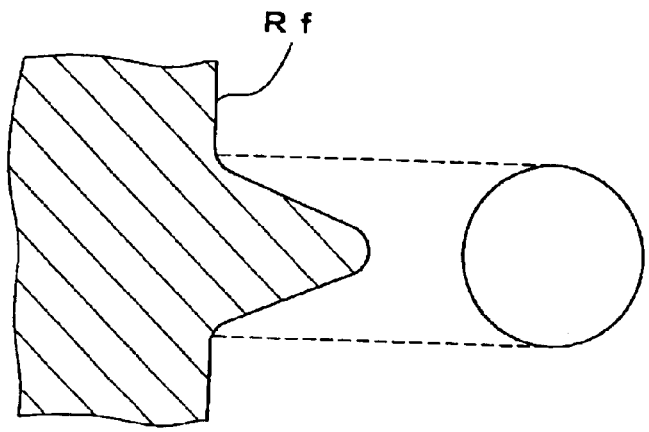
FIG. 17 shows the shape of dot (variation 4) that can be employed in the optical waveguide plate according to the present invention, in a sectional view and a plan view.

FIG. 17 shows a dot consisting of a relatively simple bulge rising from the datum reflection surface Rf, that can be easily made.

Figure 18:
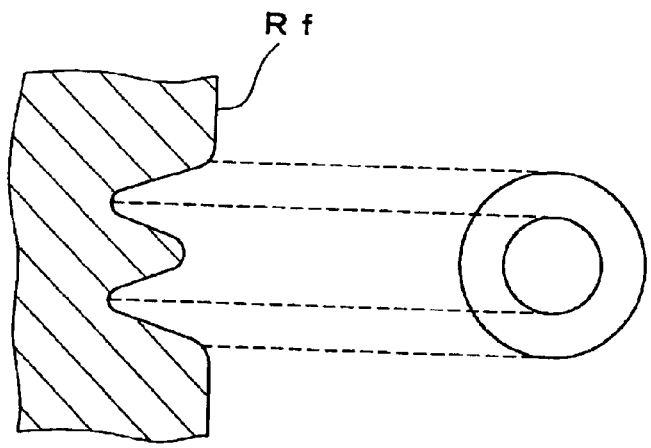
FIG. 18 shows the shape of dot (variation 5) that can be employed in the optical waveguide plate according to the present invention, in a sectional view and a plan view.
Figure 19:
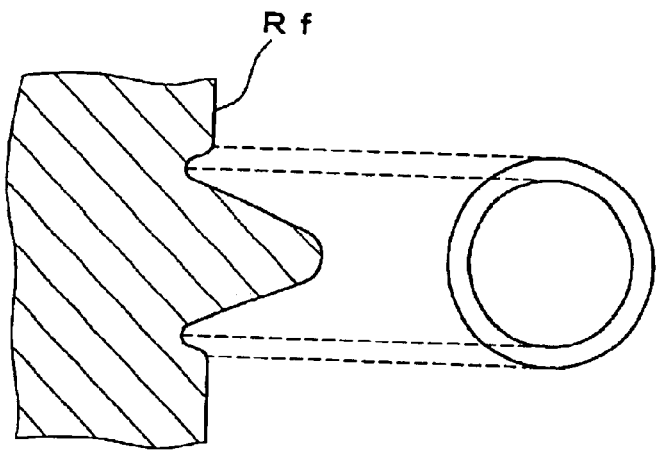
FIG. 19 shows the shape of dot (variation 6) that can be employed in the optical waveguide plate according to the present invention, in a sectional view and a plan view.
Figure 20:
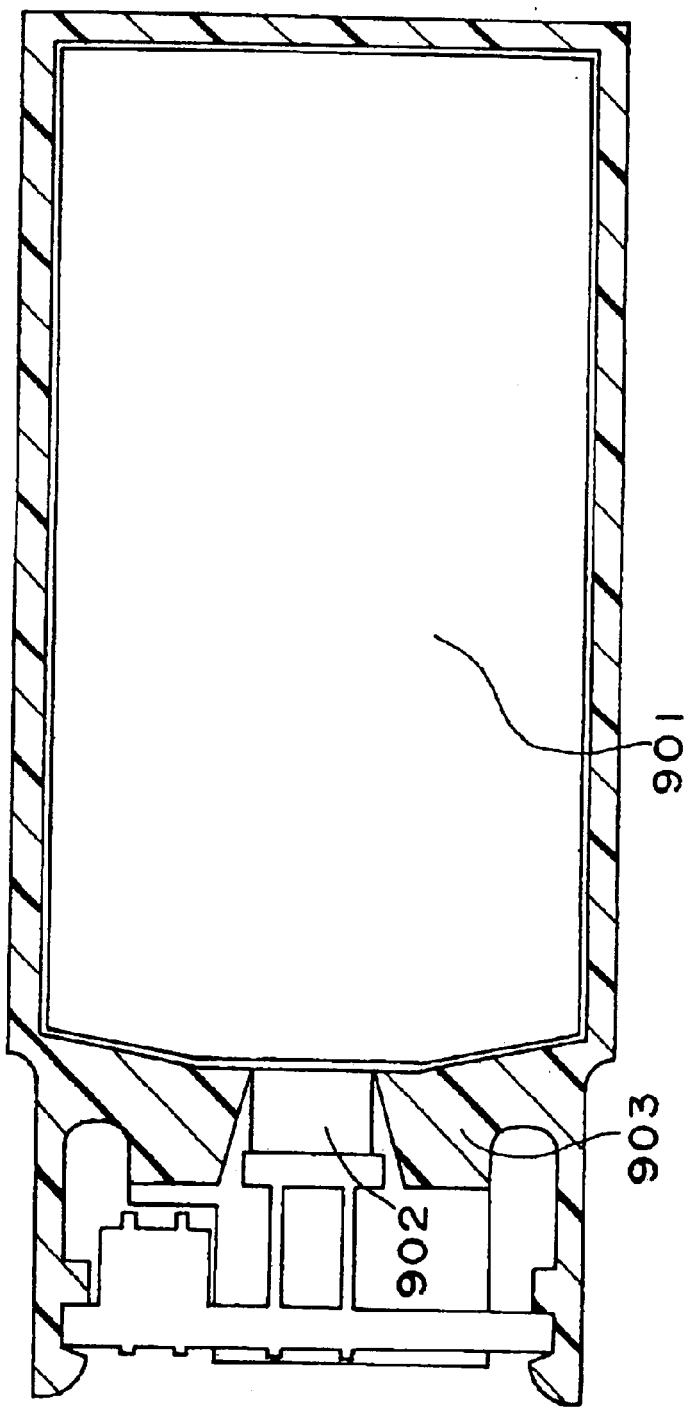
FIG. 20 is a plan view of a common surface light emitting apparatus.
Figure 21:
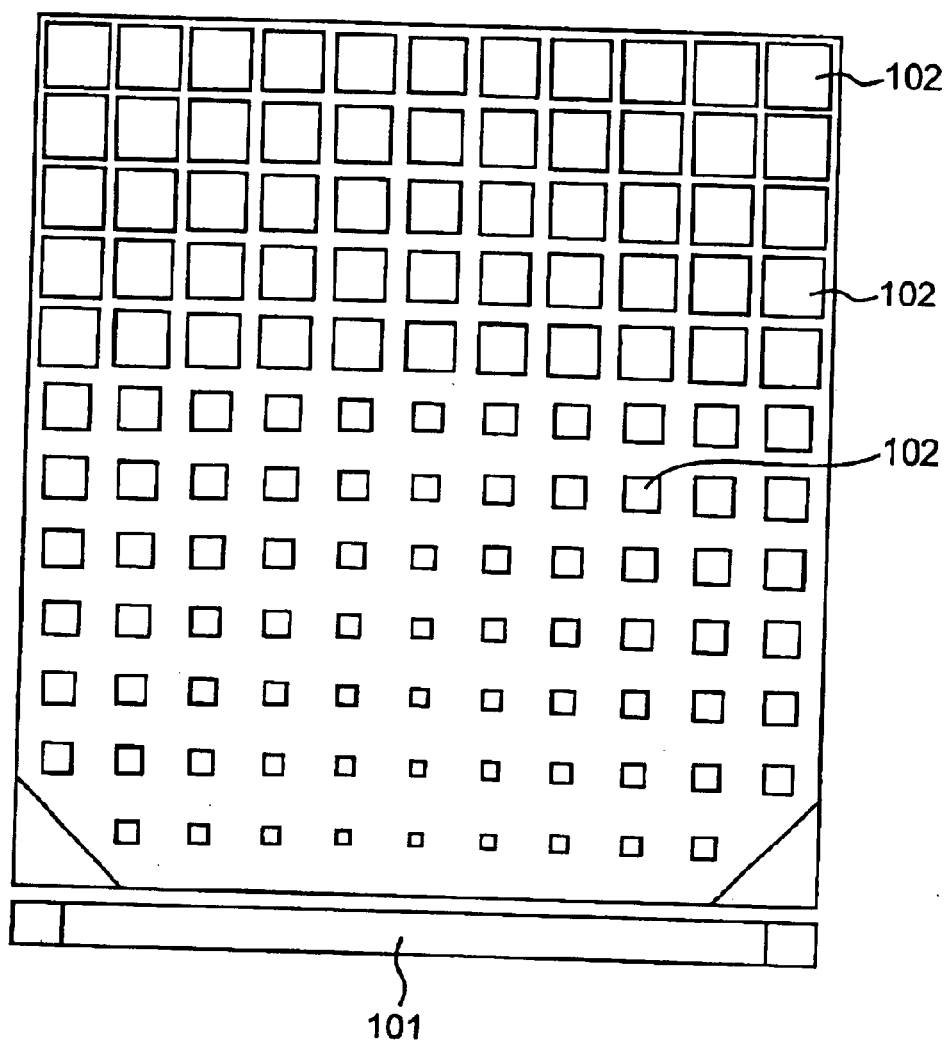
FIG. 21 is a plan view showing a n example of dot pattern formed on the reflecting surface of an optical waveguide plate of the prior art.

FIG. 18 shows a dot consisting of a recess from the datum reflection surface Rf with a bulge at the center of the recess, and FIG. 19 is a dot consisting of the bulge shown in FIG. 17 surrounded by a recess. The dots shown in FIG. 18 and FIG. 19 have higher effect of diffusing light than the simple recess shown in FIG. 17.

The dots shown in FIG. 15, FIG. 16, FIG. 18 and FIG. 19 consisting of a convex and a concave and having higher effect of diffusing light can be made relatively easily by, for example, making use of such a phenomenon as making a hole by pressing a pointed pin against a resin plate is accompanied by the formation of a ridge surrounding the hole. With this method, high reproducibility can be ensured by controlling the pressing force. This method can also be embodied with a die that has a multitude of pins, thus allowing for mass production.

According to the present invention, when the fact that light diffusing capability of the dot varies depending on the shape of the dot is made use of, brightness at every portion of the light emitting surface can be adjusted including the density and arrangement of dots described in first and second embodiments and the shape of each dot. This makes it possible to make fine adjustment of brightness of the light emitting surface that cannot be made simply by changing the density and arrangement of dots.

Particularly in the corners 54a, 54b that receive light of lower intensity and in portions having larger distance from the light source and tend to be dark, where sufficient luminance cannot be achieved by changing the density and arrangement of dots, light can be diffused effectively by selecting the dot shape, thereby improving the luminance.

Although FIG. 14 through FIG. 19 show dots having round shape in plan view, the present invention is not limited to this shape, and rectangular, polygonal or other shapes may also be employed.

In case circular dots are used in the first and second embodiments, density of dots is preferably from 10 to 78.5% and when rectangular dots are used, density of dots is preferably from 10 to 100%.

Moreover, according to the present invention, the dots may have different shapes in different regions according to the diffusion of light required, which enables it to achieve more uniform distribution of luminance over the light emitting surface.

What is claimed is:

1. An optical waveguide plate of a surface light emitting apparatus comprising a light emitting plane and a reflecting plane that oppose each other, said reflecting surface having a plurality of dots so that a light inputted from a light source that is provided on one end face or two opposing end faces is output through said light emitting surface with uniform intensity, said dots being arranged so as to form a plurality of band regions each having a constant dot distribution density and a plurality of parallel vertical lines, formed by the dots, at substantially equal intervals in the direction toward adjacent band regions, said equal intervals between the parallel vertical lines of dots being set so as to be different between adjacent ones of said plurality of band regions.

2. An optical waveguide plate of a surface light emitting apparatus comprising a light emitting plane and a reflecting plane that oppose each other, said reflecting surface having a plurality of dots so that a light inputted from a light source that is provided on one end face or two opposing end faces is output through said light emitting surface with uniform intensity, said dots being arranged so as to form a plurality of band regions each having constant dot distribution density and a plurality of parallel vertical lines formed by the dots at equal intervals in the direction toward adjacent band regions, said dots being arranged in adjacent band regions so that the parallel vertical lines of dots in one band region and the parallel vertical lines of dots in the other band region do not lie in the same straight lines.

3. The optical waveguide plates of a surface emitting apparatus according to claims 1 or 2;

wherein said dots are arranged so that a plurality of horizontal lines are formed perpendicular to said vertical lines in said each band regions, the intervals between said vertical lines and the intervals between said horizontal lines are determined in accordance to the density distribution of dots in each band region.

4. An optical waveguide plate of a surface light emitting apparatus comprising a light emitting plane and a reflecting plane that oppose each other, said reflecting surface having a plurality of dots so that a light inputted from a light source that is provided on one end face or two opposing end faces is output through said light emitting surface with uniform intensity, said dots being arranged so as to form a plurality of band regions each having constant dot distribution density and a specific geometric pattern of said dots, each one of said plurality of band regions having a different concentration of dots and geometric pattern from lines of said plurality of adjacent band regions, said dots being disposed at lattice points of a lattice consisting of square cells in each of the band regions.

5. The optical waveguide plate as in one of claims 1, 2, 4;

wherein the density of said dots in each band region is changed according to the attenuation of light transmitted from the light source.

6. The optical waveguide plate as in one of claims 1, 2, 4;

wherein said dots are arranged randomly in a density that is set according to the attenuation of light, in part of the reflector surface located on both sides of the end face where the light source is mounted.

7. The optical waveguide plates as in one of claims 1, 2, 4;

wherein said dots are arranged randomly in a density that is set according to the attenuation of light, in part of the reflector surface adjacent to said light source.

8. The optical waveguide plates as in one of claims 1, 2, 4;

wherein the dot has a concave portion and a convex portion.

9. The optical waveguide plate according to claim 8;

wherein each dot is constituted from a convex portion and a concave portion that surrounds said convex portion.

10. The optical waveguide plate according to claim 8;

wherein each dot is constituted from a concave portion and a convex portion that surrounds said concave.

* * * * *